Feb. 27, 1923.
J. M. LENTS
MEANS FOR TRANSFERRING MOLTEN GLASS
Filed Sept. 22, 1919    5 sheets-sheet 2
1,446,649
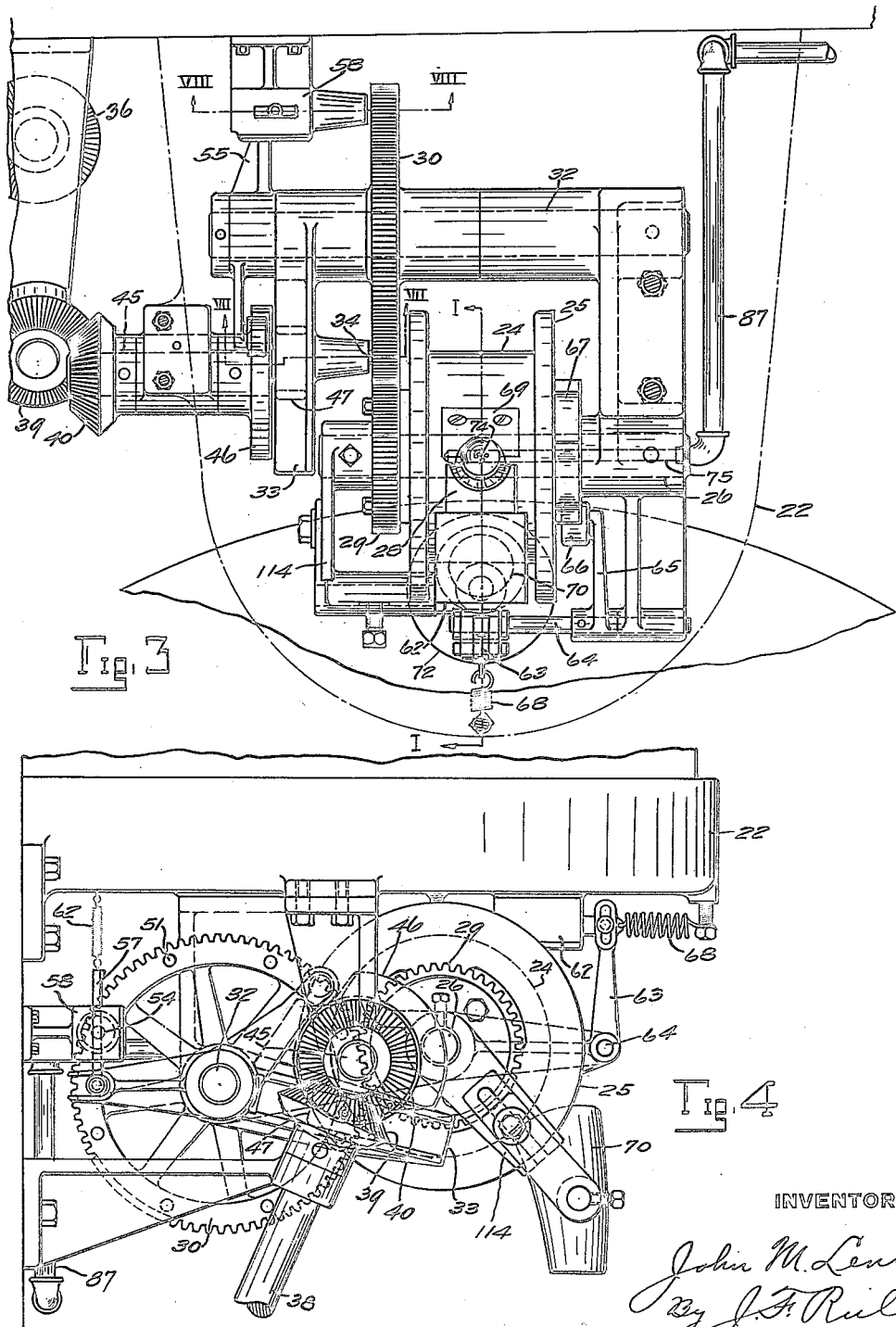
INVENTOR
John M. Lents
By J. F. Rule
His attorney.

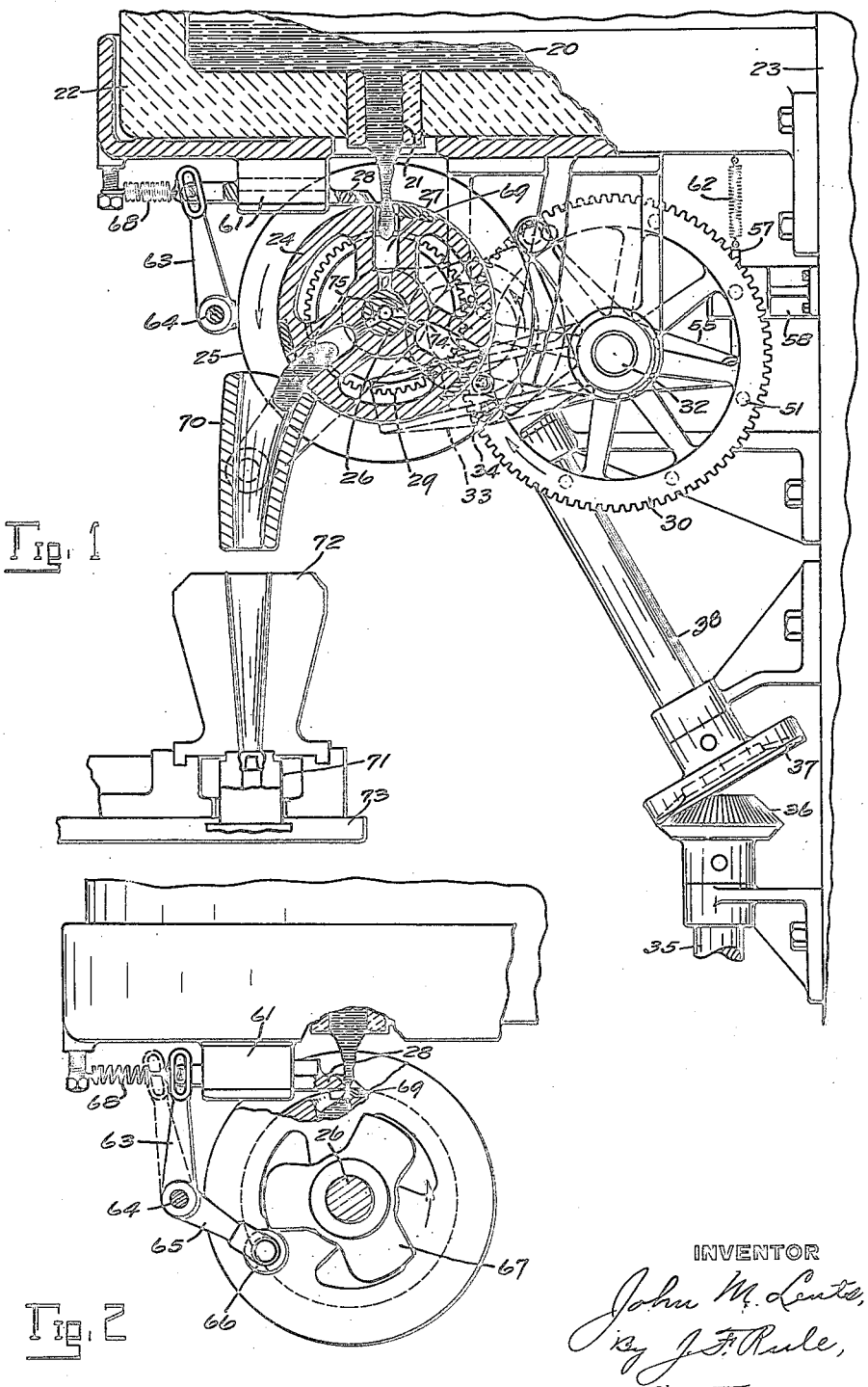

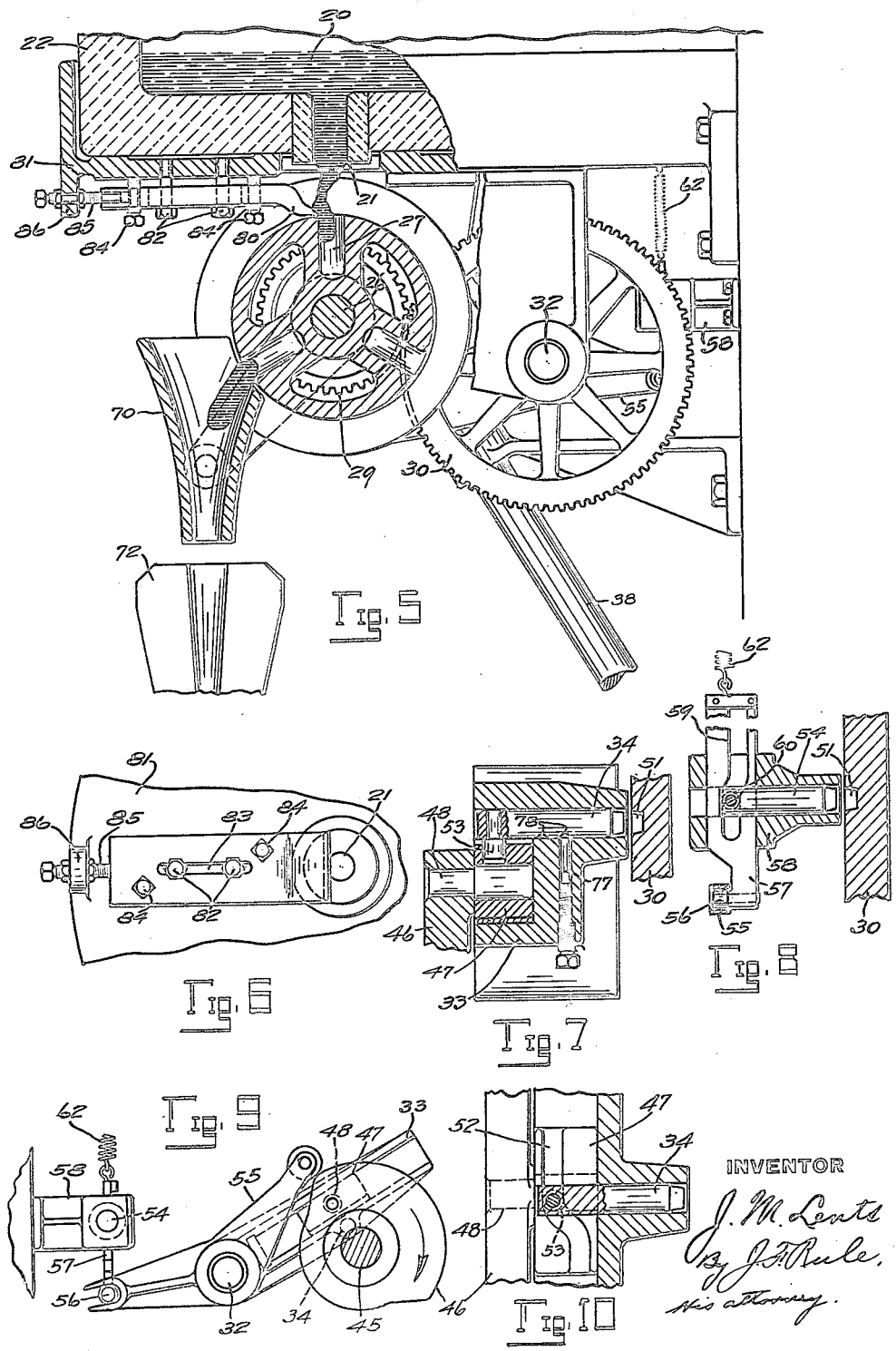

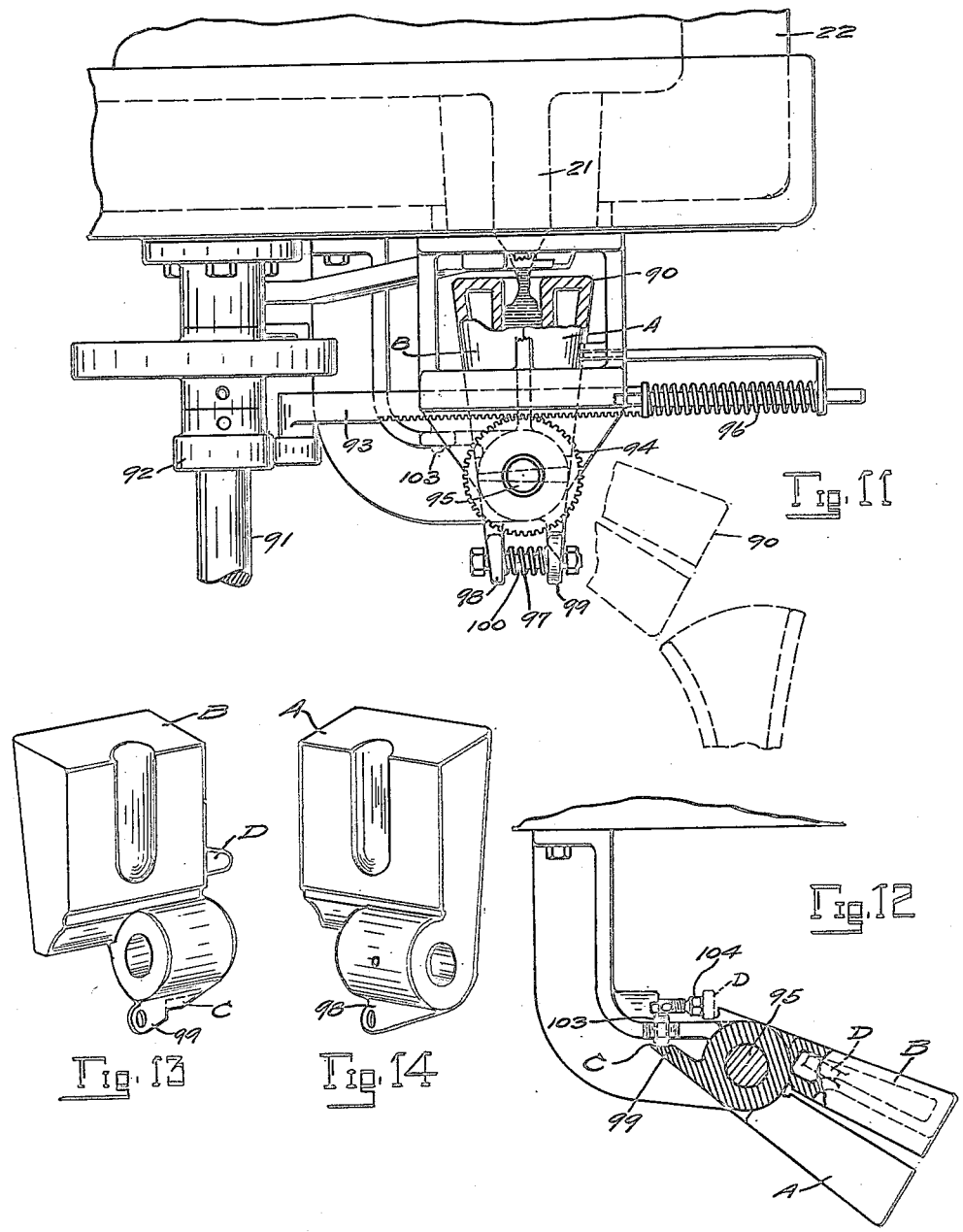

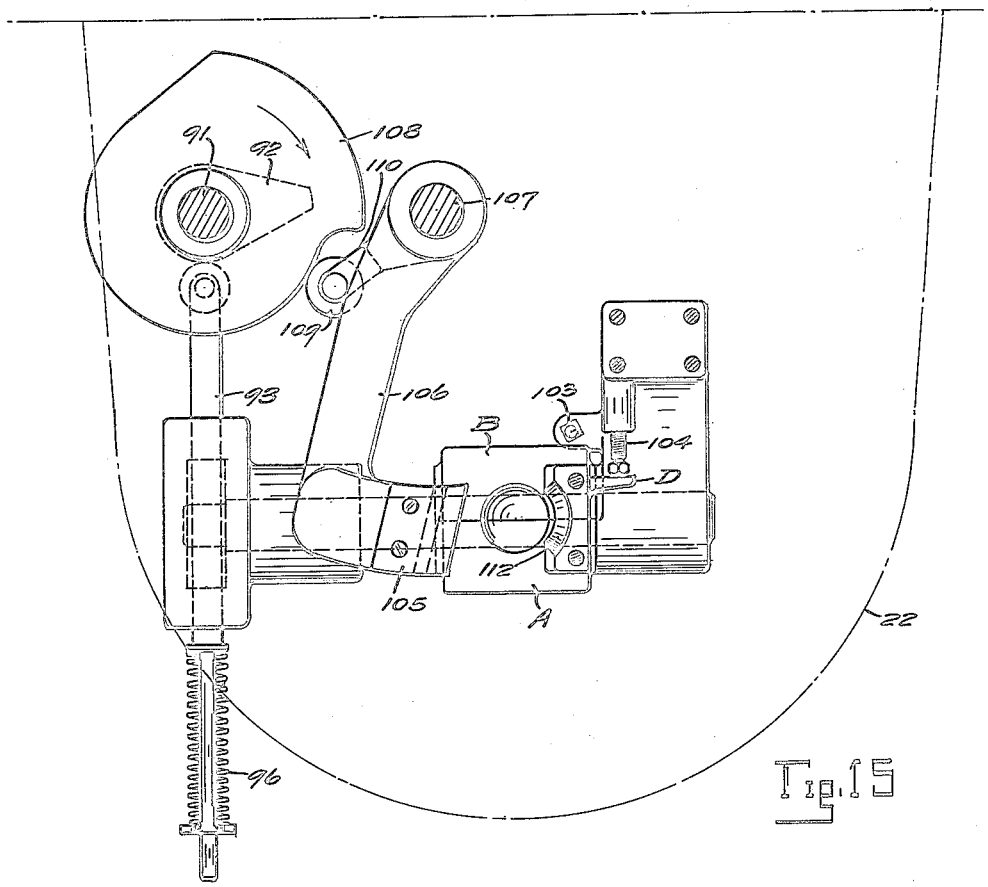
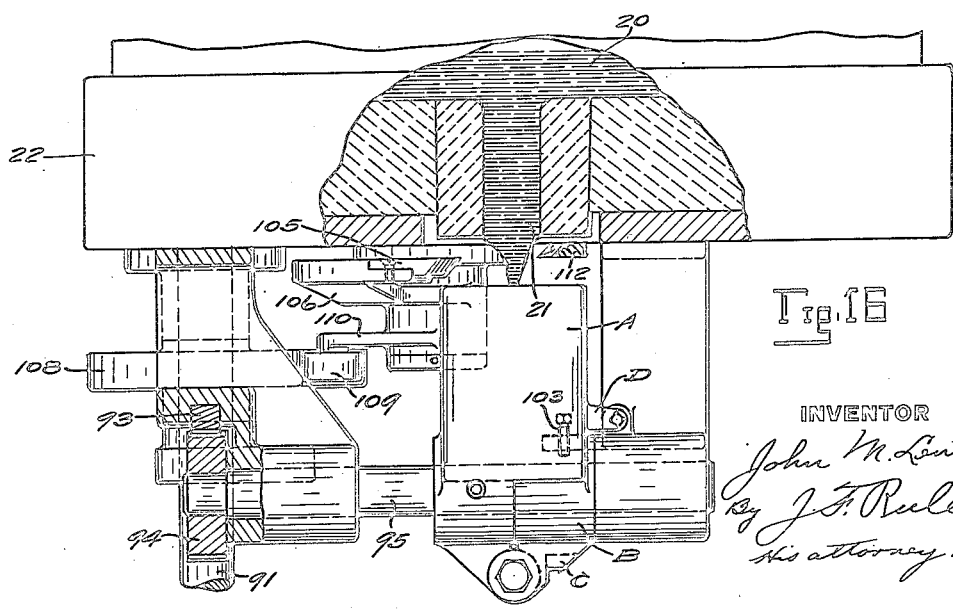

Patented Feb. 27, 1923.

1,446,649

UNITED STATES PATENT OFFICE.

JOHN MURL LEWIS, OF EVANSVILLE, INDIANA, ASSIGNOR TO THE OWENS BOTTLE COMPANY, OF TOLEDO, OHIO, A CORPORATION OF OHIO.

MEANS FOR TRANSFERRING MOLTEN GLASS.

Application filed September 22, 1919. Serial No. 325,547.

*To all whom it may concern:*

Be it known that I, JOHN MURL LEWIS, a citizen of the United States, residing at Evansville, in the county of Vanderburg and State of Indiana, have invented new and useful Improvements in Means for Transferring Molten Glass, of which the following is a specification.

My invention relates to apparatus for separating a stream of molten glass into individual masses or gobs and transferring them to molds. An object of the invention is to provide means to receive the flowing glass, form it into elongated masses or gobs of suitable shape for entering the molds, and invert said gobs during their transfer so that the hottest portion of the gob will enter the mold first. Such an arrangement is particularly desirable in the manufacture of bottles and the like in which the mold receives its charge while in inverted position, that is, with the neck end of the mold downward. By inverting the gob during its transfer to the mold the hottest portion of the glass is used to form the neck end of the bottle, which is desirable because of the rapid cooling of this portion of the mold, and because hotter and more plastic condition of the glass is required to perfectly form the comparatively small and irregular neck end than the body of the bottle. Such arrangement gives much better results than can be obtained with methods in use at present in which the coldest end of the gob enters the mold first. A further object of the invention is to provide a simple and practical arrangement for rapidly transferring the glass to the mold and in which the gob as it enters the mold is at an approximately uniform high temperature throughout.

Other objects of the invention will appear hereinafter.

In the accompanying drawings:

Figure 1 is a part sectional side elevation of a construction embodying my invention, the section being taken at the plane of the line I—I on Figure 3.

Figure 2 is a part sectional elevation showing the cutter and its operating cam.

Figure 3 is a plan view of the mechanism shown in Figure 1, the position of the furnace boot being indicated in broken lines.

Figure 4 is an elevation of the apparatus looking in the opposite direction from that of Figure 1.

Figure 5 is a view similar to Figure 1, but showing a stationary cutter.

Figure 6 is a bottom plan view of the adjustable cutter shown in Fig. 5.

Figure 7 is a section as indicated by the line VII—VII on Figure 3, showing the coupling pin by which the gob transferring device is intermittently connected with the driving mechanism.

Figure 8 is a section at the line VIII— VIII on Figure 3, showing a locking pin and its operating cam.

Figure 9 is a view showing part of the mechanism for intermittently rotating the transfer device.

Figure 10 is a sectional view showing the connecting pin shown in Figure 7.

Figure 11 is a side elevation of a modification in which the transfer cup is oscillated between the receiving and discharging position.

Figure 12 is a view showing the transfer cup in its discharging position.

Figures 13 and 14 are perspective views of the two cup sections.

Figure 15 is a plan view of the apparatus shown in Fig. 11.

Fig. 16 is a part sectional front elevation of the apparatus shown in Figure 11.

The glass 20 may be supplied to the transfer mechanism through a discharge orifice 21 in the bottom of a boot or extension 22 of the refining tank 23.

A transfer element or carrier 24 is herein shown as a cylinder provided with flanges 25 and is mounted to rotate on a non-rotating shaft 26. The carrier 24 is provided with a number of gob forming cavities or cups 27 which are brought successively beneath the orifice 21 to receive a charge of glass. After each cup receives its charge the carrier 24 is rotated to bring the cup to an inverted discharging position, permitting the gob to drop into a mold. Simultaneously with the rotation of the carrier a knife 28 is operated to sever the glass in the cup from the oncoming stream and support the latter while the succeeding cup is moving into receiving position.

The mechanism for intermittently rotating the carrier comprises a pinion 29 fixed to said carrier and meshing with a gear 30 mounted to rotate freely on a counter shaft 32. A step by step rotation is imparted to the gear 30 by an oscillating arm 33 on the shaft 32, which arm during its forward movement is connected to the gear 30 by a connecting pin 34. The pin is withdrawn from the gear at the completion of said forward movement and permits the gear to remain at rest during the return movement of the arm 33. Motion is transmitted to the arm 33 from a driving shaft 35 (Fig. 1) through bevel gears 36, 37, an inclined shaft 38, bevel gears 39, 40, shaft 45 on which the gear 40 is mounted, and a cam plate 46 keyed to the shaft 45. A connection between the plate 46 and oscillating arm 33 comprises a slide block 47 connected to said plate by a pivot pin 48, said block 47 arranged to reciprocate in a slideway in the arm 33. The plate 46 rotates continuously and through its connection with the arm 33, just described, causes the latter to swing up and down between the positions indicated in Figures 4 and 9. The arm 33 during its upward movement is connected to the gear 30 by the connecting pin 34 which during such movement is held projected into a socket 51 in the wheel 30. The pin is moved into and out of engagement with the wheel 30 by means of a cam groove 52 formed in the sliding block 47, the pin 34 carrying a detent or roll 53 which runs in said cam groove. This cam groove is so formed that as the arm 33 reaches its uppermost position, the pin 34 is retracted, but when said arm reaches its lowermost position said pin is projected into a socket 51 in the gear 30. The sockets 51 are spaced at intervals corresponding to the angular distance through which the gear 30 is rotated during each operation. The connecting pin 34 is yieldingly held in its projected and retracted positions respectively by a spring actuated detent 77 engaging notches 78 in said pin.

In order to positively hold the gear 30 against movement during the return of the arm 33 and also to thereby securely lock the carrier 24 in charge receiving position, a locking pin 54 (see Fig. 9) is provided. This locking pin, which is also adapted to enter the sockets 51 in the gear 30, is mounted in a stationary bracket 58. A lever 55 mounted to oscillate on the shaft 32, is actuated by the cam 46 and has a connection 56 with a cam plate 57 mounted to reciprocate vertically in the bracket 58. Said cam plate is provided with a cam groove 59 in which works a detent 60 on the locking pin 54. A spring 62 holds the lever 55 in engagement with its cam 46. The parts are so arranged that the locking pin 54 is projected into locking engagement with the gear 30 when the latter comes to rest as the connecting pin 34 is withdrawn. Said locking pin is also withdrawn simultaneously with the movement of the connecting pin 34 into engagement with the gear wheel.

The cutter 28, as indicated in Figures 1 and 2, is mounted to reciprocate in a stationary bracket or support 61. Said cutter is actuated by a rock arm 63 on a rock shaft 64, to which is also secured a rock arm 65 carrying a cam roll 66 running on a cam 67 connected to rotate with the transfer device 24. The cutter is retracted by a spring 68 which also holds the roll 66 in engagement with its cam. The cutter 28 cooperates with the shear blocks 69 on the carrier 24 to sever the glass with a shearing cut.

The operation of the mechanism thus far described may be summarized as follows:

A continuous rotation is imparted to the shaft 45 carrying the cam plate 46. Said plate revolves the cam block 47 in a circle, and said block through its sliding connection with the arm 33 oscillates the latter and causes the arm during each forward movement to advance the gear 30, said gear in turn rotating the carrier 24 through an angle of 120 degrees. The carrier is then held stationary during the return of the arm 33, the connecting pin 34 (which connects said arm with the gear 30 during the forward movement) being retracted before this return movement by the cam block 47. The cutter 28 is projected by its cam 67 simultaneously with the initial movement of the carrier 24, thereby severing the accumulated gob from the oncoming stream and supporting said stream while the next succeeding cup is brought beneath the flow opening. The rotation of the carrier through 120 degrees brings the cup which has just been charged to a downwardly inclined position, as shown in Figure 1, which permits the gob to drop through a chute or funnel 70 into a mold 72 on a mold table 73. The mold as here shown is an inverted blank mold of a bottle forming machine and may be one of an annular series of such molds arranged to be brought successively beneath the spout 70. The lower portion of the mold comprises a ring section or neck mold 71 in which the neck of the bottle is formed. The rotation of the mold table may be in synchronism with the operations of the transfer apparatus through any suitable mechanism. It will be observed that the gob of glass during the rotation of the carrier 24 is inverted so that the glass which has last entered the transfer cup and which, therefore, forms the hottest part of the gob, enters the mold first. This arrangement is particularly desirable because the portion of the gob entering the mold first is the part that forms the neck of the bottle. Owing to the comparatively rapid cooling of this portion of the mold and the comparative difficulty of suitably shaping the neck end of the bottle, it is desirable that the hottest portion of the glass enter the mold first. The cups or gob forming cavities 27 are shaped to form an elongated gob conforming approximately to the shape of the mold cavity, thereby enabling the gob to more readily conform to the mold.

The rotation of the transfer device 24 is sufficiently rapid so that the centrifugal force may assist gravity in expelling a gob. The discharge of the gob may further be facilitated by admitting air through small passageways 74 in the bottom of the cups 27, thereby avoiding the formation of a partial vacuum. Said openings 74 may be brought into register with a port 75 in the shaft 26 as the cup 27 nears its discharging position. The shaft 26 as shown has a central bore which may communicate through a pipe 87 (Fig. 3) with a source of air pressure, so that if desired, air pressure may be supplied to assist in quickly expelling the gobs from the cups.

Figures 5 and 6 illustrate a modified construction comprising a stationary cutter 80. This cutter is adjustably mounted on the bottom of the boot supporting frame 81 by means of bolts 82 extending through a slot 83 in the cutter bar and having a screw-threaded connection with said bracket 81. This construction permits the cutter bar to be adjusted horizontally in the direction of its length. An adjusting screw 85 threaded through a lug 86 and having a swivel connection with the cutter bar permits refinement of adjustment. The cutter is also adjustable vertically by setting up the screw bolts 82 and is clamped in its adjusted position by clamping bolts 84 which have a screw threaded connection with the cutter bar and can be set up to bear against the bracket 81.

Figures 11 to 16 inclusive illustrate a construction in which the transfer device comprises a single transfer cup 90 adapted to oscillate from an upright receiving position beneath the discharge outlet through 120 degrees (more or less) to the downwardly inclined discharging position shown in Figure 12 and in broken lines in Figure 11.

A continuously rotating drive shaft 91 has secured thereto a cam 92 which drives a horizontally reciprocable rack bar 93, the latter in turn driving a pinion 94 keyed to a rock shaft 95 on which the transfer cup is mounted. The cam 92 moves the rack outward or toward the right to swing the cup from receiving to discharging position. A spring 96 returns the rack and cup after the latter has discharged its gob. The cup 90 is made in two sections A and B, the section A being keyed to the shaft 95 and the section B mounted to normally rotate therewith but having a limited independent rotation on the shaft to separate the cup sections when in discharging position. The cup sections are normally held together by a coil spring 97 held under compression between lugs 98 and 99 on the hubs of the cup sections, said spring supported on a rod 100 mounted in said lugs. As the transfer cup swings downward to discharging position, a shoulder C on the section B strikes an adjustable stop 103 and arrests said section before the rack 93 has quite completed its forward movement. During the completion of said forward movement the cup section A continues to rotate, thereby separating the cup sections a short distance and permitting the gob to drop freely from the cup. A stationary adjustable stop 104 in the path of a lug D on the cup section B, arrests the cup as it is returned to charging position, and holds it in register with the outlet 21.

The cutting mechanism (Figs. 15 and 16) comprises a blade 105 attached to a rock arm 106 mounted on a rock shaft 107 actuated by a cam 108 operating through a roll 109 on a rock arm 110 on the shaft 107. The blade 105 cooperates with a stationary blade 112 to sever the glass with a shearing cut. The cam 108 is timed to actuate the cutter just before or as the cup commences its movement away from the receiving position. The blade 105 serves as a closure for the outlet 21 while the transfer cup is discharging. The cam 92 is so formed that the cup is rapidly moved to discharging position and quickly returned, so that it is necessary to interrupt the flow only for a short interval, thus preventing undue chilling of the glass by a lengthy contact with the cutter, and also preventing overheating of the latter.

The funnel 70 as shown in Figure 4 is pivotally supported for angular adjustment at the outer end of an extensible arm 114. This arm is mounted on the shaft 26 and angularly adjustable thereon. Set screws hold said arm and funnel in their adjusted positions.

Modifications of the constructions herein disclosed may be resorted to within the scope of my invention and some parts of the invention may be used without others.

What I claim is:

1. The combination with means for supplying a stream of molten glass, of a transfer receptacle having an elongated gob forming cavity to receive the glass and form an elongated gob, said cavity having an open end through which the glass enters, means to move said receptacle from a charge receiving position to a discharging position and discharge the gob from said open end, and an automatic cutter to sever the gob from the oncoming stream and forming a stationary support for the latter during said movement of the transfer receptacle.

2. The combination with means for flowing molten glass, of a transfer device rotatable about a horizontal axis, said device having a radially disposed elongated cavity open at its outer end to receive and discharge the glass, means to rotate said device and thereby move said cavity from receiving position beneath the flow of glass to an inverted discharging position, and means to cut off the flow and cause the glass to be supported independently of the transfer device during said rotation.

3. The combination with means for flowing glass, of a transfer device rotatable about a horizontal axis and comprising a radially disposed gob forming cavity open at its outer end to receive and discharge the glass, means for rotating said device to swing the cavity from an upright receiving position to a discharging position in which the open end of said cavity is directed downward, means to cut off the flow and cause the glass to be supported independently of the transfer device during said rotation, and means for supplying air to the botom of said cavity and thereby assisting in the discharge of the glass.

4. The combination of a gob transferring device comprising a gob receiving cup, having an upright receiving position, means to supply a charge of glass to the cup while in said position, and means to rotate said device about a horizontal axis through less than a half revolution and thereby turn the cup from said upright position and bring it to rest in a downwardly inclined position and cause the gob to be expelled therefrom by the combined action of gravity and centrifugal force.

5. The combination with means for flowing a stream of molten glass, of a transfer device comprising a series of cups or gob forming cavities, a driver movable back and forth and connected to said device during its forward movement to impart a step by step rotation to said device, automatic means to disconnect the driver from said device after each step rotation, a locking pin, and automatic means to engage said pin with the transfer device as the latter completes its forward movement and hold it against rotation while disconnected from its driver.

6. In gob transferring mechanism, the combination of a gob transferring device rotatable about a horizontal axis and provided with a series of cups arranged at intervals around its periphery, means to rotate said device step by step and thereby bring said cups successively to a receiving position, said rotating means comprising a rock arm, means to rock said arm, a rotary member connected to rotate said transfer device, a connecting pin carried by said arm, and automatic means to actuate the pin and connect said arm with the rotary member for rotation therewith while the arm moves in one direction and to disconnect said pin and permit said member to remain stationary during the return of said arm.

7. In gob transferring mechanism, the combination of a gob transferring device rotatable about a horizontal axis and provided with a series of cups arranged at intervals around its periphery, means to rotate said device step by step and thereby bring said cups successively to a receiving position, said rotating means comprising a rock arm, means to rock said arm, a rotary member connected to rotate said transfer device, a connecting pin carried by said arm, automatic means to actuate the pin and connect said arm with the rotary member for rotation therewith while the arm moves in one direction and to disconnect said pin and permit said member to remain stationary during the return of said arm, a locking pin, and automatic means to move said locking pin into engagement with said rotary member and hold the latter in locked position while disconnected from the rock arm.

Signed at Evansville, in the county of Vanderburg and State of Indiana, this 16th day of Sept., 1919.

JOHN MURL LENTS.